March 15, 1960     R. E. HOTZE ET AL     2,928,928
MECHANISM FOR SELECTIVELY FEEDING AND POSITIONING ARTICLES
IN WORK STATIONS OF AN ARTICLE-FABRICATING APPARATUS
Filed March 7, 1958     3 Sheets-Sheet 1
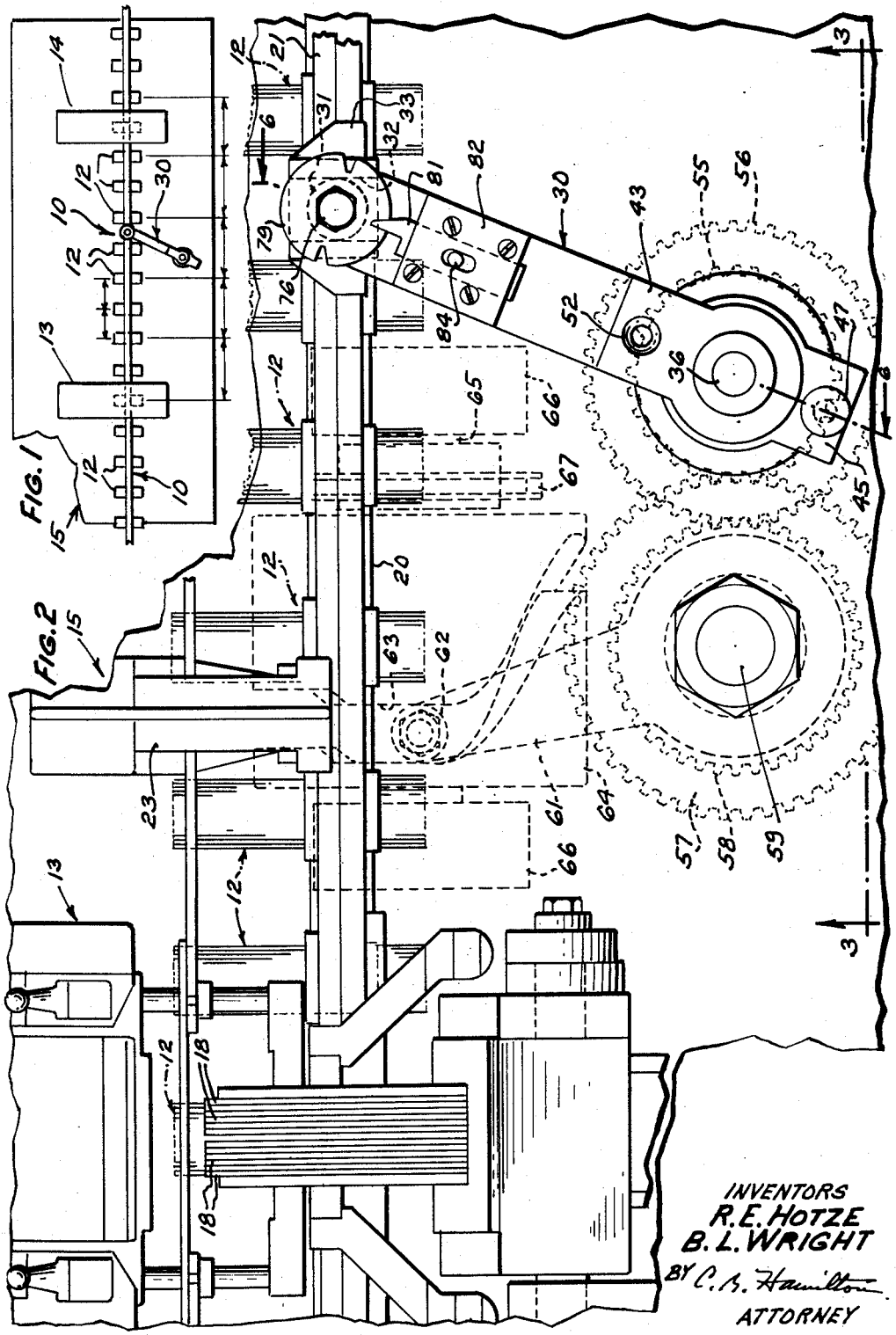
INVENTORS
R. E. HOTZE
B. L. WRIGHT
BY C. B. Hamilton
ATTORNEY

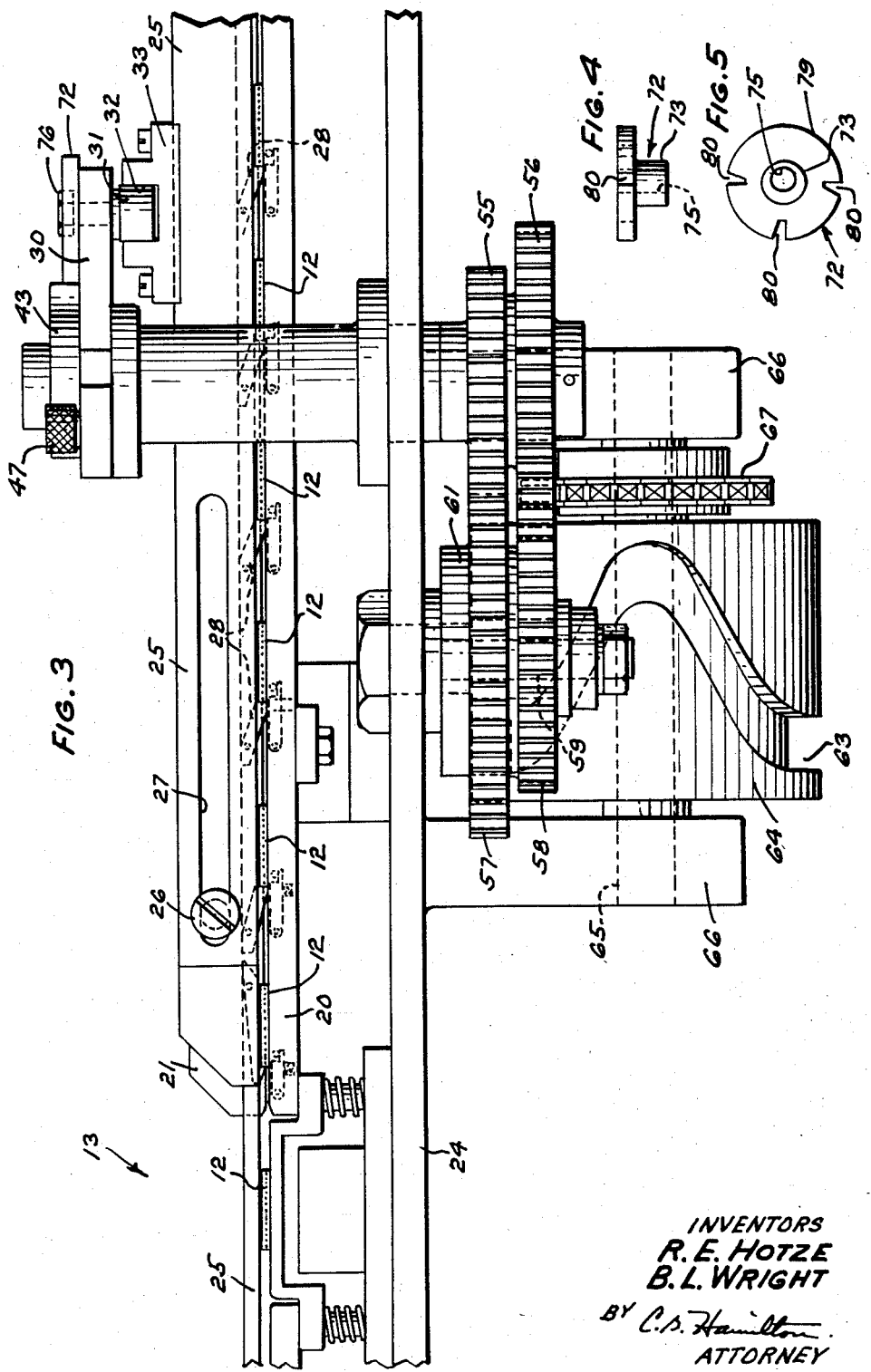

March 15, 1960 R. E. HOTZE ET AL 2,928,928
MECHANISM FOR SELECTIVELY FEEDING AND POSITIONING ARTICLES
IN WORK STATIONS OF AN ARTICLE-FABRICATING APPARATUS
Filed March 7, 1958 3 Sheets-Sheet 3
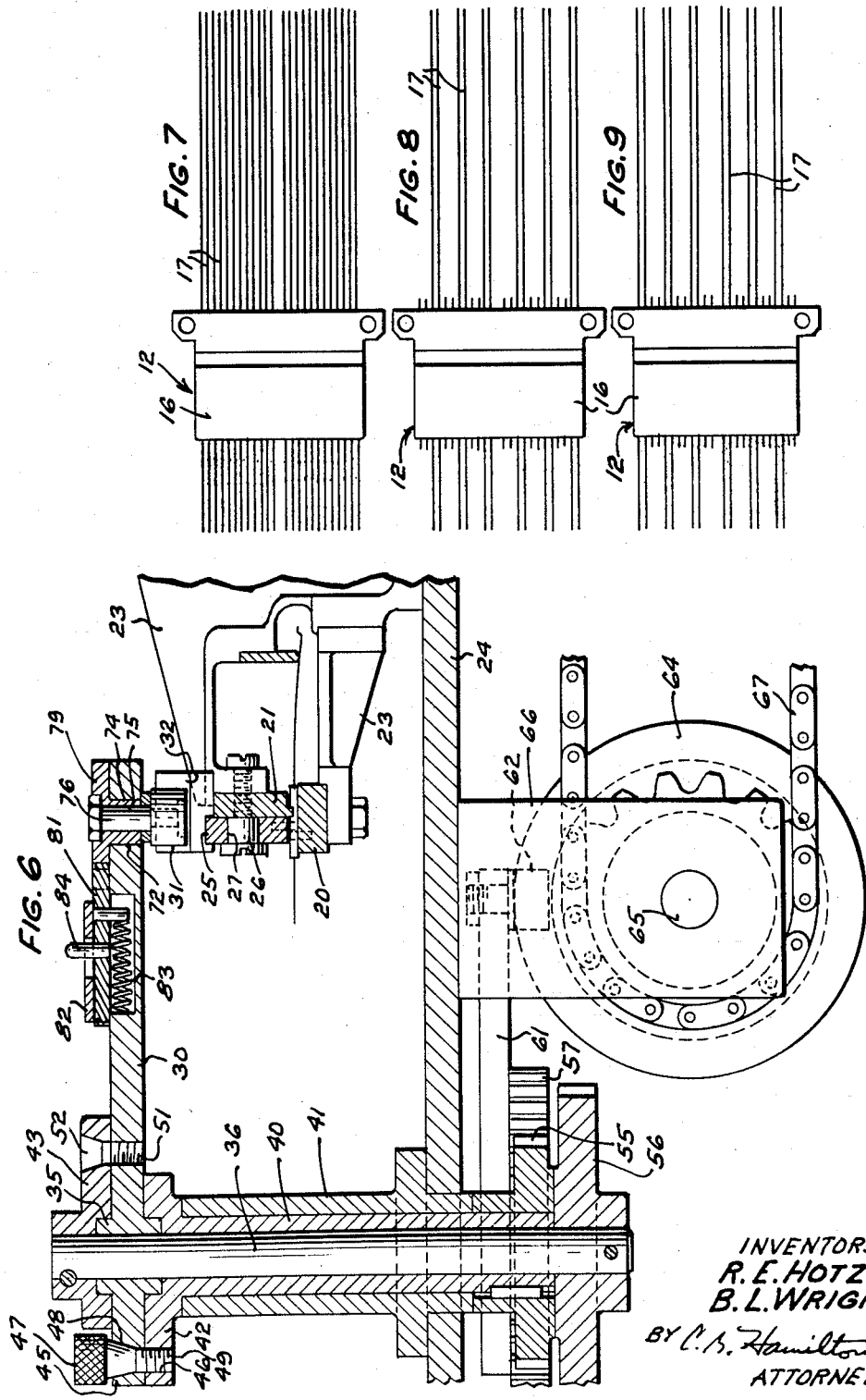
INVENTORS
R. E. HOTZE
B. L. WRIGHT
BY C. B. Hamilton
ATTORNEY

United States Patent Office 2,928,928
Patented Mar. 15, 1960

2,928,928

MECHANISM FOR SELECTIVELY FEEDING AND POSITIONING ARTICLES IN WORK STATIONS OF AN ARTICLE-FABRICATING APPARATUS

Robert E. Hotze, Westchester, and Ben L. Wright, Chicago, Ill., assignors to Western Electric Company, Incorporated, New York, N.Y., a corporation of New York Application March 7, 1958, Serial No. 719,946

7 Claims. (Cl. 219—79)

This invention relates to a feeding mechanism for an article-fabricating apparatus and more particularly to a selectively operable reciprocable mechanism for advancing articles through different distances and locating the articles in various predetermined positions in a pair of work stations in an apparatus for welding contacts onto the articles.

An object of the present invention is to provide in an article-working apparatus a feeding mechanism for selectively advancing the articles into a plurality of work stations.

Another object of the invention is the provision in an article-fabricating apparatus of an article-feeding mechanism for selectively advancing the articles into various predetermined positions in a plurality of work stations.

With these and other objects in view, the invention contemplates, in an article-working apparatus having two work stations, the provision of a track for supporting the articles for movement along a predetermined path to and from the work stations, a reciprocable feed bar for advancing the articles step by step into predetermined positions in the work stations, an oscillatable arm adjustably connected at one end to the feed bar and selectively connectible at the other end to a pair of drive members oscillated through different distances by a drive mechanism whereby the feed bar may be reciprocated through a short stroke to advance the articles successively into both work stations or the feed bar may be advanced through a long stroke twice that of the short stroke to feed one set of alternate articles into only one work station and the other set of alternate articles into only the other work station.

Other objects and advantages will become apparent by reference to the following detailed description thereof and the accompanying drawings illustrating a preferred embodiment thereof, in which Fig. 1 is a diagrammatic plan view of a welding apparatus with a selectively operable article-feeding mechanism embodying the present invention;

Fig. 2 is a fragmentary plan view of the apparatus and the article-feeding mechanism;

Fig. 3 is a fragmentary vertical sectional view taken on line 3—3 of Fig. 2;

Figs. 4 and 5 are side and bottom views, respectively, of an eccentric adjusting bushing of the mechanism;

Fig. 6 is a vertical sectional view of the mechanism taken on line 6—6 of Fig. 2; and Figs. 7, 8 and 9 are views of different types of wire-spring components which are advanced on the present article-feeding mechanism.

The present article-feeding mechanism 10 is an improvement of the article-feeding mechanism disclosed in the Myers' Patent 2,771,539 and is designed to advance articles in the form of wire-spring relay components 12 (Figs. 7–9) step by step along a predetermined path into a pair of welding stations 13 and 14 (Fig. 1) of a welding apparatus 15. The wire-spring relay components 12 are of various types, the first type having a block 16 of molded dielectric material in which is supported a row of 12 pairs of parallel wire springs 17. A second type of wire-spring relay component 12 (Fig. 8) has only the even numbered pairs of wire springs 17, the odd numbered pairs being severed or omitted therefrom, and a third type of wire-spring relay component (Fig. 9) has only the odd numbered pairs of wire springs 17, the even numbered pairs being severed or omitted therefrom.

The welding apparatus 15, disclosed in more detail in the previously referred to Myers' patent, has 12 welding electrodes 18 at each of the welding stations 13 and 14, the stations and the electrodes therein being positioned in predetermined spaced relation to each other. The article-feeding mechanism 10 serves to advance successive relay components 12 of the first type step by step along a predetermined path to successively position a relay component in the first welding station 13 with one set of alternate wire springs 17 thereof in alignment with the electrodes 18 and to position a relay component 12 in the second welding station 14 with the second set of alternate wire springs in alignment with the electrodes 18, whereby contacts may be welded onto the ends of the first set of alternate wire springs 17 on the relay component 12 at the first welding station 13 and contacts may be welded onto the second set of alternate wire springs of a relay component at the second welding station 14. With the welding apparatus set up in this manner, contacts are welded onto the ends of each of the 24 wire springs of a relay component in two operations, 12 of these contacts being welded onto alternate wire springs in the first welding station 13 in one operation and the remaining 12 contacts being welded onto the remaining 12 wire springs at the second welding station 14.

When it is desired to weld contacts onto the ends of wire springs of relay components of the second type (Fig. 8) or the third type (Fig. 9), portions of the welding apparatus 15 are modified to incorporate the structure disclosed in the copending application, Serial No. 672,464, filed July 17, 1957, which provides means for spreading the 12 wire springs 17 of the second or the third types of relay components into alignment with the electrodes 18 at each of the welding stations 13 and 14, whereby contacts may be welded simultaneously onto all of the 12 wire springs of the relay component at each of the welding stations 13 and 14. When the welding apparatus 15 is thus set up to fabricate relay components of the second or the third types, the selectively operable article-feeding mechanism 10 is set to be reciprocated through a longer stroke to effect the feeding of pairs of relay components having no contacts thereon into the welding stations 13 and 14 for the simultaneous welding of contacts onto all of the wire springs thereon.

Referring to Figs. 2, 3 and 6, the article-feeding mechanism comprises horizontally disposed lower and upper tracks 20 and 21 for receiving the blocks 16 of the relay components therebetween and supporting and guiding them for movement along a predetermined path into the loading stations 13 and 14. The tracks 20 and 21 are supported on brackets 23 mounted on a horizontal frame plate 24. A horizontally disposed feed bar 25 is slidably mounted on headed pins 26 which are secured to the upper track 21 and ride in slots at 27 in the feed bar. Pawls 28 pivotally mounted on the feed bar 25 are adapted to engage the blocks 16 and advance the relay components 12 in response to reciprocation of the feed bar.

Reciprocation is imparted to the feed bar 25 by an oscillatable arm 30 on one end of which is mounted a roller 31 which rides in a transverse groove 32 of a member 33 secured to the feed bar. The other end of the arm 30 has an apertured hub 35 (Fig. 6) in which the upper end of a shaft 36 is rotatably disposed.

This shaft is rotatably mounted in a sleeve 40 which is journaled for rotation in a bearing 41 secured to the frame plate 24. At its upper end the sleeve 40 has a flat connector element 42 engageable with the lower side of the arm 30, and the shaft 36 has a connector element 43 fixedly secured thereto and engageable with the upper surface of the arm 30. A tapered aperture 45 in the arm 30 is alignable with a threaded aperture 46 in the connector element 42 of the sleeve 40 whereby a locking pin 47 having a shank with a tapered portion 48 and threaded lower portion 49 may be screwed into the aligned apertures 45 and 46 to lock the arm 30 to the sleeve 40 for oscillatable movement therewith. A threaded aperture 51 in the arm 30 is alignable with a tapered aperture 52 in the connector element 43 on the shaft 36 whereby the locking pin 47 may be removed from the apertures 45 and 46 and screwed into the aligned apertures 51 and 52 to connect the arm 30 to the shaft 36 for oscillatable movement therewith.

A gear 55 is keyed to the lower end of the sleeve 40 and a gear 56 is pinned to the lower end of the shaft 36. These gears 55 and 56 mesh with gears 57 and 58 (Figs. 2 and 3) which are secured to each other and form a gear cluster rotatably supported on a stud 59 fixedly mounted to the plate 24. Secured to the gear cluster 57 and 58 is one end of a lever 61 which has a cam roller 62 riding in a cam groove 63 of a barrel cam 64, the cam being mounted on a shaft 65 journaled in bearing brackets 66 mounted on the underneath side of the plate 24. Rotation is imparted to the shaft 65 and the cam 64 through a chain and sprocket connection 67 from a main drive shaft (not shown) from which the electrodes 18 are also actuated.

In response to rotation of the cam 64, the lever 61 oscillates the gear cluster 57 and 58 which in turn imparts oscillatable movement to the sleeve 30 and the shaft 36, the extent of oscillatable movement of the sleeve being twice that of the shaft. When the arm 30 is connected to the shaft 36 by means of the locking pin 47, the feed bar 25 advances the relay components 12 through 3 inch increments, and when the arm 30 is connected to the sleeve 40 by means of the locking pin 47, the feed bar 25 advances the relay components through 6 inch increments.

As seen in Fig. 1, the welding station 13 and 14 are spaced from each other a distance equal to an odd number of 3 inch increments. Thus, when the apparatus is set up to fabricate relay components of the first type (Fig. 7), the arm 30 is connected to the shaft 36 and each of the relay components is moved sequentially through 3 inch increments into the first and the second welding stations 13 and 14 and contacts are welded to the wire springs 17 of the relay components in two welding operations. When the apparatus is set up for welding contacts onto relays 12 of the second or third types and the arm 30 is connected to the sleeve 40, the relay components are advanced step by step through 6 inch increments whereby one set of alternate relay components 12 are fed successively into only the first welding station 13 and the other set of alternate relay components 12 are fed successively into only the second welding station 14, and contacts are welded simultaneously onto all of the wire springs 17 of the relay components at the welding stations 13 and 14.

It is essential that the relay components 12 be accurately located in predetermined positions at the welding stations, and in view of the fact that the springs 17 are located in different positions on the blocks 16 of the three types of wire-spring components, it is necessary to adjust the different types of wire-spring components individually in predetermined positions at the welding stations to obtain precise alignment of the wire springs 17 with the electrodes 18.

Means are provided on the arm 30 for adjusting the position of the feed bar 25 relative to the arm 30 which comprises an adjustable bushing 72 (Figs. 2, 4, 5 and 6) mounted on the arm 30 for supporting the roller 31. The bushing 72 is rotatably mounted in a bore 74 in the arm 30 and has an eccentrically disposed bore 75 for receiving the shank of a stud 76 on which the roller is rotatably supported. An enlarged head 79 on the bushing 72 rests on the upper surface of the arm 30 and has three notches 80 formed therein 90° apart from one another which cooperate with a spring-pressed plunger 81 for holding the bushing against turning movement. The plunger 81 is slidably mounted in a guide 82 on the arm 30 and is urged into engagement with the head 79 by a spring 83 and has a pin 84 by means of which it may be manually retracted from the notches 80. By moving the bushing 72 through one or two 90° increments, the position of the roller 31 is changed relative to the arm to effect movement of the feed bar 29 relative to the arm into three predetermined positions. In this manner the bushing 72 may be set to the proper position for a predetermined feeding operation so that the feed pawls 28 on the feed bar 25 will locate the relay components 12 in predetermined positions in the welding stations 13 and 14 in accordance with the type of relay component being fabricated.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In an article-working apparatus having a pair of work stations, means for supporting the articles for movement along a predetermined path through the work stations, a feed means having elements thereon for advancing the articles and spacing them on the supporting means in predetermined positions relative to each other and to the work stations whereby in response to actuation of the feed means through a predetermined first movement the articles are positioned sequentially in each of the work stations and in response to actuation of the feed means through a predetermined second movement alternate articles are positioned successively in only one of the work stations and the other articles are positioned successively in only the other work station, and means for selectively actuating the feed means through said first and second movements.

2. In an article-fabricating apparatus having first and second work stations, a track for supporting the articles for movement along a predetermined path to and from the work stations, a feed bar having pawls thereon for advancing the articles and spacing them on the track in predetermined positions relative to each other and to the work stations whereby in response to actuation of the feed bar through a predetermined short stroke the articles are positioned sequentially in each of the work stations and in response to actuation of the feed bar through a predetermined long stroke alternate articles are positioned successively in only the first work station and the other articles are positioned successively in only the second work station, a first drive means for reciprocating the feed bar through said short stroke, a second drive means for reciprocating the feed bar through said long stroke, and means for selectively rendering said drive means operative.

3. In an article-working apparatus having a pair of work stations, a track for supporting the articles for movement along a predetermined path to and from the work stations, a feed bar having feed pawls thereon for spacing the articles on the track in predetermined positions relative to each other and to the work stations whereby in response to actuation of the feed bar through a predetermined short stroke the articles are advanced successively into each of the work stations and in response to actuation of the feed bar through a predetermined long stroke alternate articles are positioned successively in one of the work stations and the other articles are positioned successively in the other work station, an actuating arm operatively connected to the feed bar for reciprocating said feed bar, means including a first element connectible to the actuating arm for effecting the reciprocation of the feed bar through said short stroke, means including a second element connectible to the actuating arm for reciprocating the feed bar through said long stroke, and means for selectively connecting the actuating arm to said elements.

4. In an article-feeding mechanism the combination of means for supporting articles for movement along a predetermined path, a reciprocable feed bar for advancing the articles step by step along said path, an actuating arm for reciprocating the feed bar, means for operatively connecting one end of the arm to the feed bar, a shaft extending loosely through the other end of said arm, a sleeve, means mounting the sleeve and the shaft in telescoping relation for rotation relative to each other, a first gear of one side secured to the shaft, a second gear of another size secured to the sleeve, a gear cluster having gears of different sizes mounted for rotation in meshing engagement with said first and said second gears, means for oscillating the gear cluster through a predetermined angle to effect the oscillation of the shaft and the sleeve through different angular distances, and means for selectively connecting the actuating arm to the sleeve and to the shaft.

5. In an apparatus having a pair of work stations in a predetermined spaced relation to each other, means for supporting articles for movement through a predetermined path to and from said work stations, a reciprocable feed bar for advancing the articles step by step along said path into predetermined positions in said work stations, an actuating arm for reciprocating the feed bar, means for operatively connecting one end of the arm to the feed bar, means for mounting the arm for oscillation about a predetermined axis disposed through the other end of said arm, a pair of drive elements mounted for oscillation about said axis and connectible to said arm, means for simultaneously oscillating said pair of drive elements individually through different predetermined angular distances, and means for selectively connecting the arm to said drive elements to effect the oscillation of said arm and the reciprocation of said feed bar through a predetermined short stroke or a predetermined long stroke, the work stations and the strokes of the feed bar being arranged so that the feed bar when operating on the short stroke feeds each of the articles into both work stations and when operating on the long stroke feeds alternate articles into only one of the work stations and the other articles into only the other work station.

6. In an article-working apparatus having a pair of work stations, a track for supporting the articles for movement along a predetermined path to and from the work stations, a feed bar having pawls thereon for advancing the articles and spacing them on the track in predetermined positions relative to each other and to the work stations whereby in response to actuation of the feed bar through a predetermined short stroke the articles are positioned sequentially in each of the work stations and in response to actuation of the feed bar through a predetermined long stroke alternate articles are positioned in only one of the work stations and the other articles are positioned in only the other work station, an arm for actuating the feed bar, means for adjustably connecting one end of the arm to the feed bar, a shaft extending loosely through the other end of said arm, a sleeve mounted in telescoping relation to the shaft, drive means for simultaneously oscillating the shaft and the sleeve through different angular distances, and means for selectively connecting the arm to the shaft and the sleeve, said means for adjustably connecting one end of the arm to the feed bar comprising a bushing oscillatably mounted on said one end of the arm, a roller rotatably supported on the bushing in eccentric relation to the axis thereof, a member on said feed bar having a transverse slot for receiving said roller therein, said bushing being oscillatable to various positions for adjusting the feed bar to different predetermined positions relative to said arm, and means on the arm for releasably holding the bushing in adjusted position.

7. In an article-working apparatus having a plurality of work stations, means for supporting the articles for movement along a predetermined path through the work stations, feed means for advancing the articles and spacing them on the supporting means in predetermined positions relative to each other and to the work stations, and means for selectively actuating said feed means intermittently through a plurality of predetermined different distances whereby in response to intermittent actuation of said feed means through one predetermined distance the articles are positioned sequentially in each of the work stations and in response to intermittent actuation of the feed means through other predetermined distances the articles are selectively positioned in only selected work stations.

References Cited in the file of this patent

UNITED STATES PATENTS

| 2,003,118 | Mirfield et al. | May 28, 1935 |
| 2,023,897 | Neckerman | Dec. 10, 1935 |
| 2,084,889 | Blevins | June 22, 1937 |